(12) United States Patent
Kamiya et al.

(10) Patent No.: US 9,410,856 B2
(45) Date of Patent: Aug. 9, 2016

(54) SENSOR DEVICE, SENSOR MODULE, FORCE DETECTION DEVICE, AND ROBOT

(71) Applicant: Seiko Epson Corporation, Tokyo (JP)

(72) Inventors: Toshiyuki Kamiya, Fujimi (JP); Hiroki Kawai, Matsumoto (JP)

(73) Assignee: Seiko Epson Corporation (JP)

( * ) Notice: Subject to any disclaimer, the term of this patent is extended or adjusted under 35 U.S.C. 154(b) by 121 days.

(21) Appl. No.: 13/967,575

(22) Filed: Aug. 15, 2013

(65) Prior Publication Data

US 2014/0053660 A1 Feb. 27, 2014

(30) Foreign Application Priority Data

Aug. 22, 2012 (JP) .................................. 2012-182987

(51) Int. Cl.
*G01L 1/16* (2006.01)
*G01L 5/16* (2006.01)

(52) U.S. Cl.
CPC . *G01L 1/16* (2013.01); *G01L 1/162* (2013.01); *G01L 5/167* (2013.01); *Y10S 901/46* (2013.01)

(58) Field of Classification Search
CPC ............ G01L 1/16; G01L 1/106; B25J 13/08; B25J 19/02; B62D 57/032
USPC .............. 73/862.59, 862.68; 294/907; 901/46
See application file for complete search history.

(56) References Cited

U.S. PATENT DOCUMENTS

| 3,566,163 | A | | 2/1971 | Hans Fischer et al. |
| 4,620,436 | A | | 11/1986 | Hirabayashi et al. |
| 4,821,584 | A | * | 4/1989 | Lembke ..................... 73/862.68 |
| 5,297,430 | A | | 3/1994 | Sonderegger et al. |
| 7,004,035 | B2 | | 2/2006 | Saito et al. |
| 8,869,632 | B2 | * | 10/2014 | Tsuchiya et al. ........... 73/862.59 |
| 8,887,582 | B2 | * | 11/2014 | Suzuki ....................... 73/862.59 |
| 2012/0260745 | A1 | | 10/2012 | Tsuchiya et al. |

FOREIGN PATENT DOCUMENTS

| JP | 39-018592 | | 9/1964 |
| JP | 52-134482 | | 11/1977 |
| JP | 61-090895 | A | 5/1986 |
| JP | 03-071029 | A | 3/1991 |
| JP | 04-231827 | | 8/1992 |
| JP | 06-018341 | A | 1/1994 |
| JP | 06-050774 | | 2/1994 |
| JP | 06-130079 | | 5/1994 |
| JP | 2004-361308 | A | 12/2004 |
| JP | 2008-157628 | A | 7/2008 |
| JP | 2012-220462 | A | 11/2012 |
| JP | 2013-053985 | A | 3/2013 |

* cited by examiner

*Primary Examiner* — Lisa Caputo
*Assistant Examiner* — Octavia Hollington
(74) *Attorney, Agent, or Firm* — Harness, Dickey & Pierce, P.L.C.

(57) ABSTRACT

A package having a recessed section, a sensor element arranged in the recessed section and having a piezoelectric material, a lid joined to the package and sealing the recessed section of the package are provided. The package has a first hollow portion which a part of the sensor element fits with, on an inner bottom surface of the recessed section. The lid has a second hollow portion which a part of the sensor element fits with.

1 Claim, 11 Drawing Sheets

SENSOR DEVICE, SENSOR MODULE, FORCE DETECTION DEVICE, AND ROBOT

BACKGROUND

1. Technical Field

The present invention relates to a sensor device, a sensor module, a force detection device, and a robot.

2. Related Art

According to a related art, a force sensor disclosed in JP-A-4-231827 is known as a force sensor using a piezoelectric material. JP-A-4-231827 discloses a force sensor in which a signal electrode is held between crystal discs of a piezoelectric material and in which plural measuring elements held between metal cover discs are arranged inside a metal ring by welding.

Figure 10:
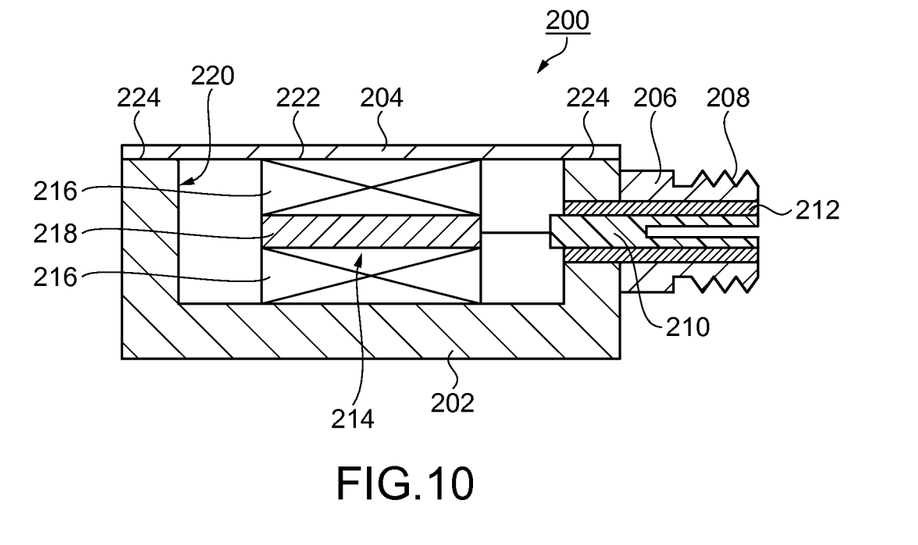
FIG. 10 is a schematic view showing a related-art sensor device.

FIG. 10 shows a sensor device according to a related art. As shown in FIG. 10, a sensor device 200 is formed as a whole by a metallic package 202 having a sensor element 214 and a recessed section to accommodate the sensor element 214, and a metallic plate-like lid 204 which is joined to the top surface (joining surface 224) that is an outer circumference of an opening 220 of the recessed section of the package 202 and which contacts the sensor element 214.

The sensor element 214 includes a detection electrode 218 inserted between two quartz plates 216 having the same cut surface, with the quartz plates 216 facing each other.

The top surface of the quartz plate 216 is a contact surface 222 of the sensor element 214 and contacts the lid 204.

Meanwhile, a coaxial connector 206 is attached to a lateral side of the package 202. The coaxial connector 206 has an outer circumferential portion 208 and a center conductor 210. The space between these two components is filled with an insulating resin 212, and the outer circumferential portion 208 and the center conductor 210 are electrically insulated from each other. Here, the outer circumferential portion 208 is short circuited with the package 202 and the lid 204, and the center conductor 210 is electrically connected to the detection electrode 218.

This sensor device 200 is inserted between pressurizing plates (not shown) and thus pressurized. The lid 204 transmits a force (pressure) to the contact surface 222 of the sensor element 214. Then, a force (pressure) applied to the quartz plates 216 changes according to an external force applied to the pressurizing plates. The quartz plates 216 output (induce) electric charge accompanying this applied force, in the detection electrode 218 by a piezoelectric effect. Therefore, by assuming a signal output in the case of pressurization only as a reference output, and monitoring the amount of change in output electric charge due to change in the force (pressure) via the coaxial connector 206, the external force applied to the sensor device 200 can be detected.

Here, in the sensor device 200, the sensor element 214 is sealed by the lid 204 in the state where the inside of the package 202 is filled with dry air so that the electric charge induced by the quartz plates 216 does not leak because of a fall in insulation resistance due to moisture or the like.

The force sensor disclosed in JP-A-4-231827 has a structure in which a signal electrode is held between crystal discs and in which the crystal discs are held between metal cover discs. If this is welded to a metal ring, the individual parts such as the signal electrode have dimensional differences and the differences cause irregularities at the welded portion, possibly generating a gap in the weld. Therefore, if the external environment is in poor condition such as high humidity, entry of moisture into the sensor element may cause leakage of electric charge, making stable measurement difficult.

Meanwhile, in the related-art sensor device shown in FIG. 10, the height of the contact surface 222 of the sensor element 214 accommodated in the package 202 and the height of the joining surface 224 that is the outer circumference of the opening 220 of the recessed section of the package 202 may not coincide with each other in some cases.

Figure 11A:
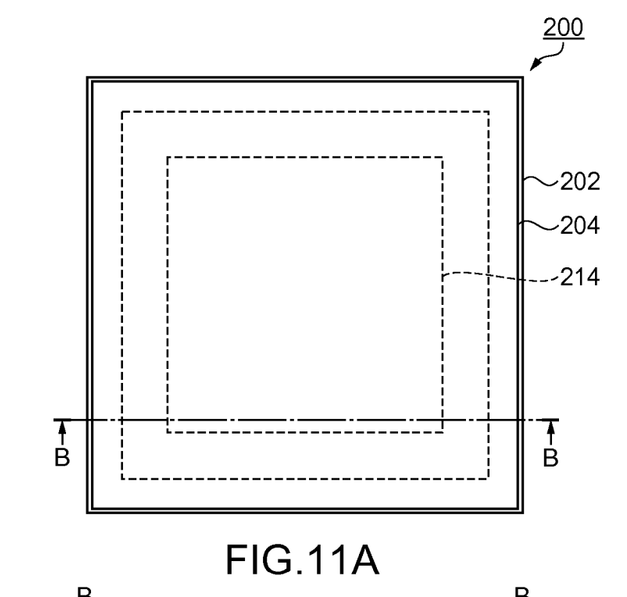
FIG. 11A is a plan view before the lid is joined to the package.
Figure 11B:
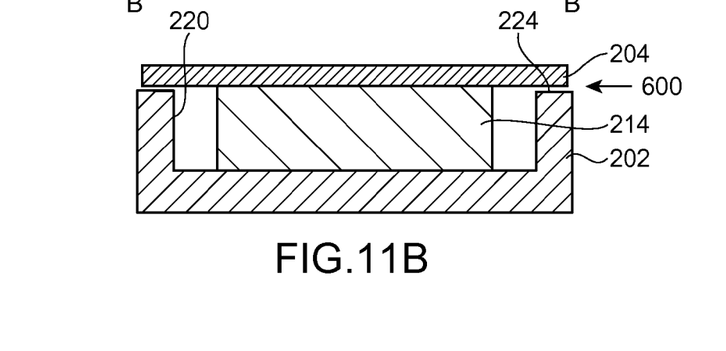
FIG. 11B is a sectional view taken along B-B in FIG. 11A.
Figure 11C:
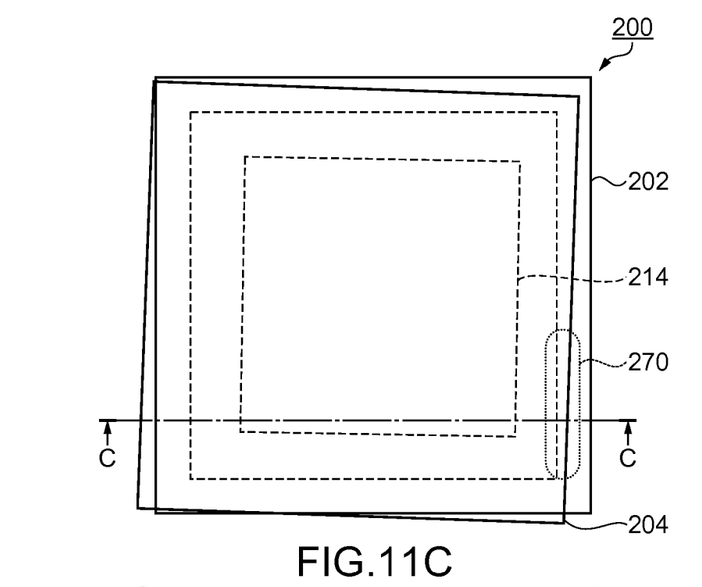
FIG. 11C is a plan view after the lid is joined to the package.
Figure 11D:
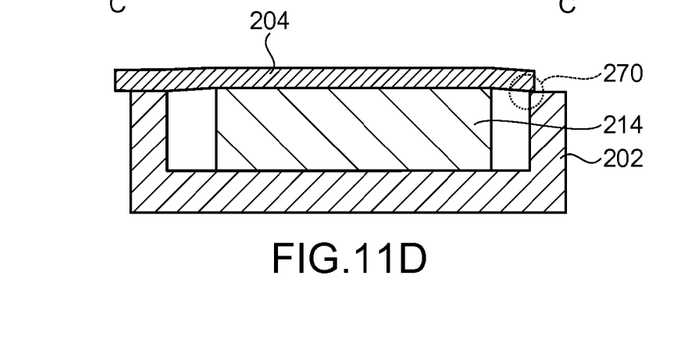
FIG. 11D is a sectional view taken along C-C in FIG. 11C.

FIGS. 11A to 11D show schematic views of the related-art sensor device (the height of the contact surface>the height of the joining surface). FIGS. 11A and 11B are plan and sectional views before the lid is joined. FIGS. 11C and 11D are plan and sectional views after the lid is joined. Here, for simplification, the quartz plates and detection electrode as components of the sensor element 214, and the wire and connector for taking out a signal outside the package are not shown.

As shown in FIGS. 11A and 11B, before the lid 204 is joined to the package 202, the sensor element 214 is aligned with and placed at the center of the recessed section of the package 202, and the lid 204 is placed thereon to cover the opening 220 of the recessed section of the package 202. At this point, since there are manufacturing variances in the heights of the package 202 and the sensor element 214, a gap 600 may be formed between the lid 204 and the joining surface 224.

Figure 12:
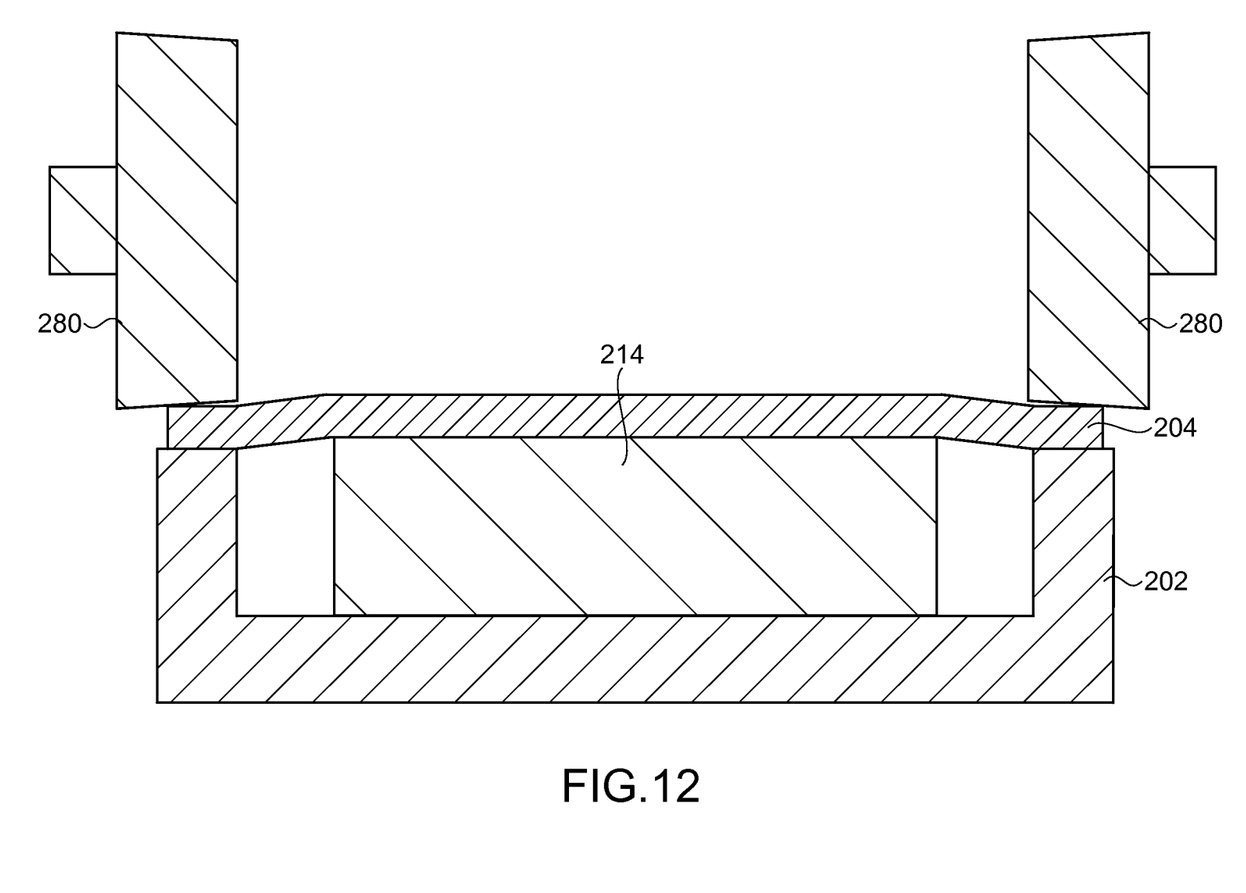
FIG. 12 is a schematic view showing the related-art sensor device at the time of seam welding.

Next, as shown in FIG. 12, roller electrodes 280 are pressed against positions (joining surface 224) on the lid 204 that connect to the package 202, and a current is applied to the roller electrodes 280 to join and airtightly seal the lid 204 and the package 202 by seam welding.

When this lid 204 is seam-welded, the sensor element 214 and the lid 204 may be misaligned by vibrations in a carrying process or the pressing force of the roller electrodes 280, and the lid 204 is often joined to the package 202 with a misalignment as viewed in a plan view, as shown in FIG. 11C. In such a case, on the joining surface 224 between the lid 204 and the package 202, a portion (insufficient joining area 270) where the lid 204 and the package 202 are joined together with only a very short length left between the inside and outside of the package is formed, as shown in FIG. 11D. This insufficient joining area 270 has low stress resistance. Therefore, in the sensor device 200, to which a force is applied repeatedly, repetition fatigue may break the joining between the lid 204 and the package 202 and break the airtight sealing, thus impairing reliability.

Meanwhile, if the contact surface between the package 202 and the sensor element 214 and the contact surface between the sensor element 214 and the lid 204 are bonded with an adhesive in order to prevent misalignment of the sensor element 214 and the lid 204 at the time of seal welding, a creep phenomenon due to pressurization causes a long-term reduction in the thickness of the adhesive layer, which causes a fall in applied pressure. Thus, there is a problem that force detection characteristics may change or force detection may become impossible. Thus, in view of the characteristics and reliability of the sensor device, it is not preferable to use an adhesive to bond the contact surface between the package 202 and the sensor element 214 and the contact surface between the sensor element 214 and the lid 204.

SUMMARY

An advantage of some aspects of the invention is that a sensor device, a sensor module, a force detection device, and a robot that can stably maintain detection characteristics of a sensor element accommodated in a package over a long period are provided by forming a stably producible structure of a package that does not easily deteriorate.

The invention can be implemented as the following application examples.

Application Example 1

This application example is directed to a sensor device including: a first member having a recessed section; a second member joined to the first member in such a way as to seal the recessed section; and a sensor element having a piezoelectric material and arranged in the recessed section. A first hollow portion which a part of the sensor element fits with is formed on an inner bottom surface of the recessed section. A second hollow portion which a part of the sensor element fits with is formed on the second member.

According to this application example, the sensor element is aligned with the first member in the state where the sensor element is fitted with the first hollow portion, and the second member is aligned with the sensor element in the state where the sensor element is fitted with the second hollow portion. Therefore, the first member and the second member are indirectly aligned with each other via the sensor element, and the first member and the second member are joined together without any misalignment. Thus, the sensor device can be manufactured, stably securing a sufficient length between the inside and outside of the package on the joining surface between the first member and the second member. Therefore, the sensor device can stably maintain detection characteristics of the sensor element accommodated in the first member over a long period.

Application Example 2

This application example is directed to the sensor device according to the application example described above, wherein the sensor element has a first contact surface which the first member contacts, and a second contact surface which the second member contacts, the first member has a first flat portion having a flat surface which contacts the first contact surface, and the second member has a second flat portion having a flat surface which contacts the second contact surface.

According to this application example, the first member and the sensor element directly contact each other at the first flat portion and the first contact surface, and the second member and the sensor element directly contact each other at the second flat portion and the second contact surface. There is no member that causes creep in the transmission path of applied pressure. Therefore, a fall in applied pressure due to a creep phenomenon does not occur. Thus the sensor device can stably maintain detection characteristics of the sensor element accommodated in the first member over a long period.

Application Example 3

This application example is directed to the sensor device according to the application example described above, wherein, if a normal direction of the second contact surface of the sensor element is a Z-axis direction and directions orthogonal to the Z-axis direction and orthogonal to each other are X-axis direction and Y-axis direction, the sensor element has at least one of a first sensor element which detects a force in the X-axis direction, a second sensor element which detects a force in the Y-axis direction, and a third sensor element which detects a force in the Z-axis direction.

According to this application example, a force in an arbitrary direction can be detected according to purpose of use.

Application Example 4

This application example is directed to a sensor module including: a first member having a recessed section; a sensor element having a piezoelectric material and arranged in the recessed section; a second member joined to the first member in such a way as to seal the recessed section; a first plate which contacts the first member; a second plate which contacts the second member; and a fastening portion which fastens the first plate and the second plate. The sensor element has a first contact surface which the first member contacts, and a second contact surface which the second member contacts. A first hollow portion which the first contact surface fits with is formed on an inner bottom surface of the recessed section. A second hollow portion which the second contact surface fits with is formed on the second member.

According to this application example, for the same reasons as Application Example 1, the sensor module can stably maintain detection characteristics of the sensor element accommodated in the first member over a long period.

Application Example 5

This application example is directed to a force detection device has the above sensor device.

According to this application example, for the same reasons as Application Example 1, the force detection device can maintain detection characteristics of the sensor element accommodated in the first member over a long period.

Application Example 6

This application example is directed to a force detection device including: a first member having a recessed section; a sensor element having a piezoelectric material and arranged in the recessed section; a second member joined to the first member in such a way as to seal the recessed section; and an electronic circuit which electrically connects to the sensor element. The sensor element has a first contact surface which the first member contacts, and a second contact surface which the second member contacts. A first hollow portion with which the first contact surface fits is formed on an inner bottom surface of the recessed section. A second hollow portion with which the second contact surface fits is formed on the second member.

According to this application example, for the same reasons as Application Example 1, the force detection device can maintain detection characteristics of the sensor element accommodated in the first member over a long period.

Application Example 7

This application example is directed to a robot has the above force detection device.

According to this application example, for the same reasons as Application Example 1, the robot can maintain detection characteristics of the sensor element accommodated in the first member over a long period.

Application Example 8

This application example is directed to a robot including: a main body portion; an arm portion connecting to the main body portion; and a hand portion connecting to the arm portion. The robot has a sensor device at a connecting part between the arm portion and the hand portion. The sensor device includes: a first member having a recessed section; a sensor element having a piezoelectric material and arranged in the recessed section; and a second member joined to the first member in such a way as to seal the recessed section. The sensor element has a first contact surface which the first member contacts, and a second contact surface which the second member contacts. A first hollow portion which the first contact surface fits with is formed on an inner bottom surface of the recessed section. A second hollow portion which the second contact surface fits with is formed on the second member.

According to this application example, for the same reasons as Application Example 1, the robot can maintain detection characteristics of the sensor element accommodated in the first member over a long period and can detect an external force applied to the arm portion and the hand portion.

BRIEF DESCRIPTION OF THE DRAWINGS

The invention will be described with reference to the accompanying drawings, wherein like numbers reference like element.

FIGS. 1A and 1B are schematic views showing a sensor device according to a first embodiment.

FIGS. 11A to 11D are schematic views showing a related-art sensor device.

DESCRIPTION OF EXEMPLARY EMBODIMENTS

Hereinafter, the invention will be described in detail, using illustrated embodiments. However, components described in the embodiments, and kinds, combinations, shapes and relative positions thereof are not intended to limit the scope of the invention to the embodiments but are simply illustrative examples unless otherwise stated.

First Embodiment

Figure 1A:
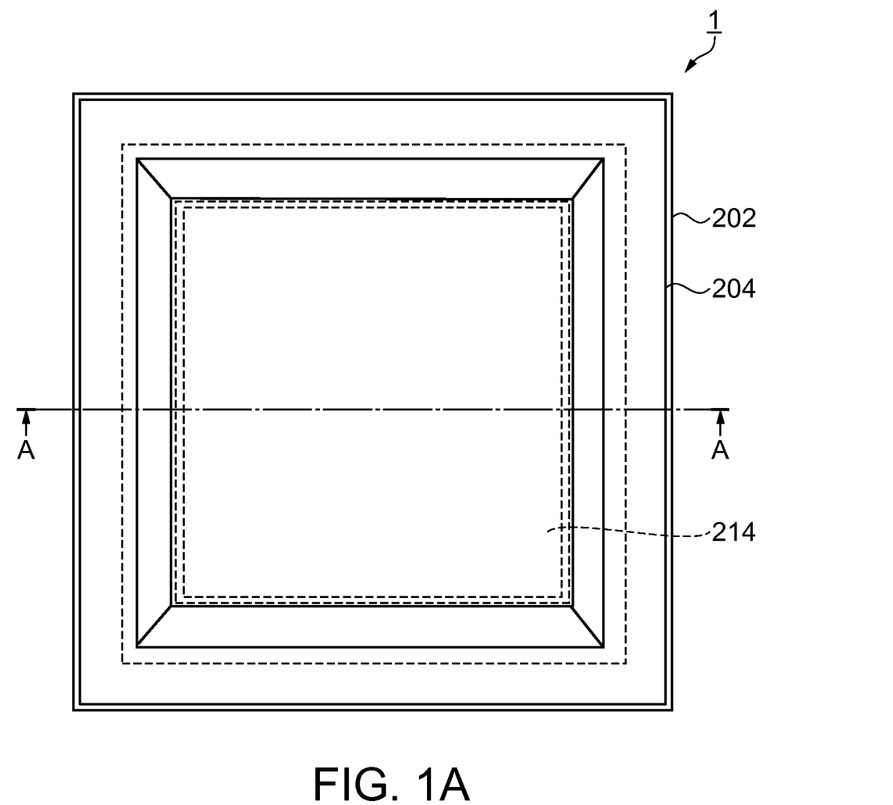
FIG. 1A is a plan view.
Figure 1B:
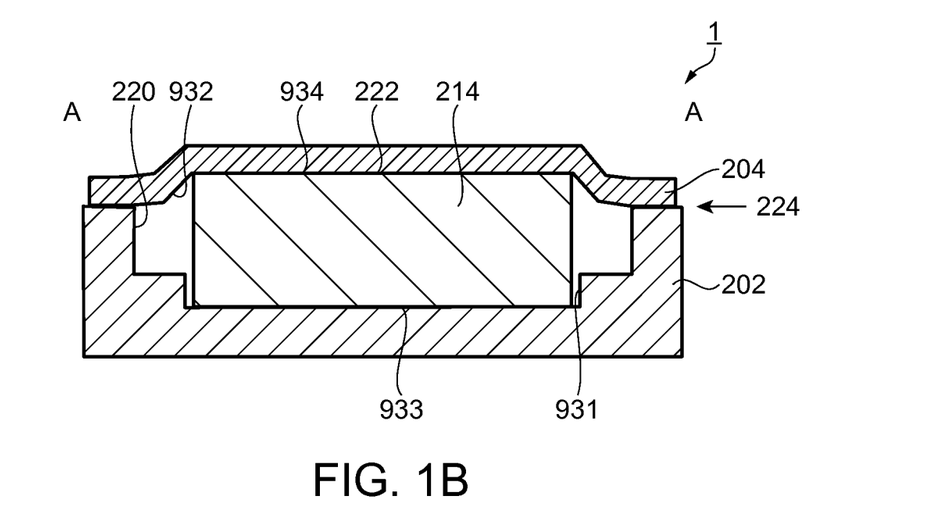
FIG. 1B is a sectional view taken along A-A in FIG. 1A.
Figure 2A:
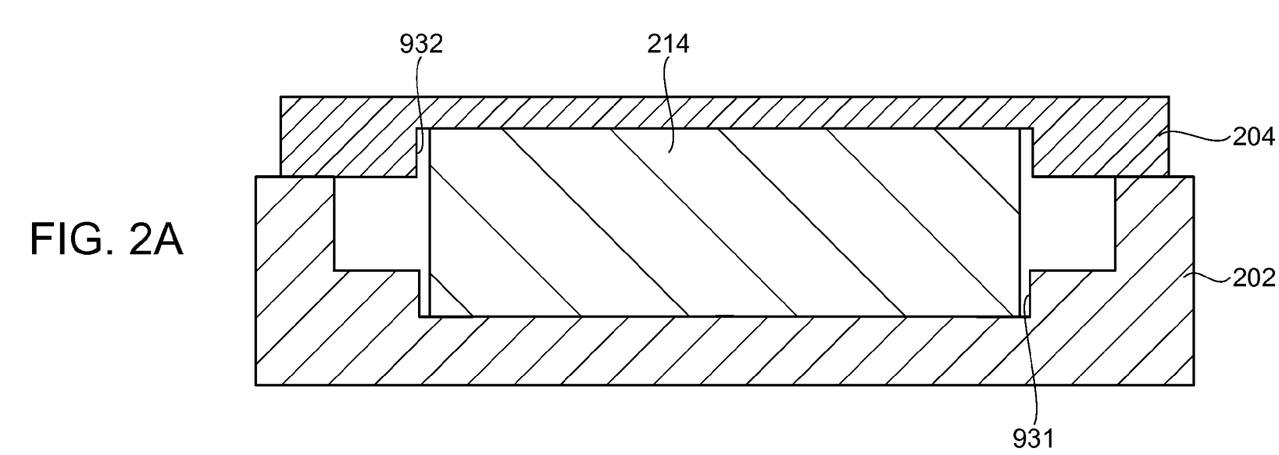
FIGS. 2A and 2B are sectional views showing modifications of a lid of the embodiment.
Figure 2B:
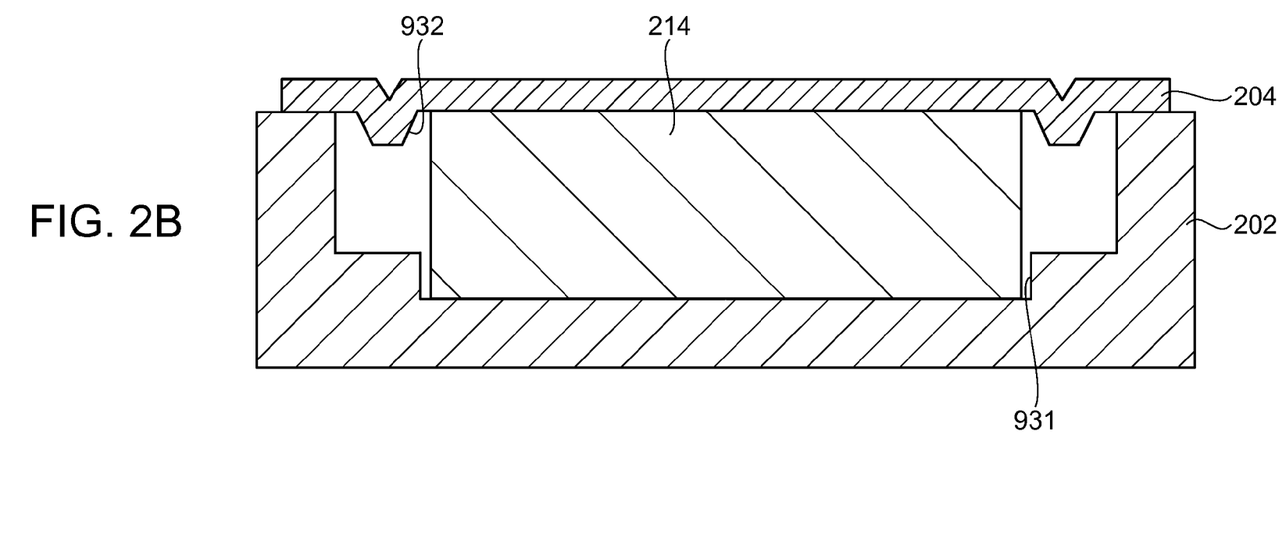

FIGS. 1A and 1B show schematic views of a sensor device according to a first embodiment. FIG. 1A is a plan view. FIG. 1B is a sectional view taken along A-A in FIG. 1A. FIGS. 2A and 2B are sectional views showing modifications of a lid of the embodiment. The basic configuration of a sensor device 1 of the first embodiment is similar to the related-art sensor device 200. Therefore, the same components are denoted by the same reference numerals and will not be described further in detail unless necessary.

The sensor device 1 of this embodiment is mainly formed by a package (first member) 202, a sensor element 214, and a lid (second member) 204. The package 202 has a recessed section. On the inner bottom surface of the recessed section, a first hollow portion 931 which a bottom part of the sensor element 214 fits with is formed. On the lid 204, a second hollow portion 932 which a top part of the sensor element 214 fits with is formed.

The bottom part of the sensor element 214 is placed inside the first hollow portion 931. The lid 204 is placed on the sensor element 214 in the state where the second hollow portion 932 is fitted with the top part of the sensor element 214, and the lid 204 covers an opening 220 of the recessed section of the package 202. The lid 204 is joined at its circumferential edge to a joining surface 224 of the package 202. The package 202 has a package structure with a recessed section and is mainly made of a metal, ceramics or the like. Although not shown, an electrode, wire, connector or the like to take out output from the sensor element 214 outside of the package is properly provided on the package 202.

The lid 204 joined to the package 202 is made of a metal such as stainless steel or Kovar (or ceramics as will be described later). The lid 204 may be shaped by pressing a flat thin plate to form the second hollow portion 932 as shown in FIGS. 1A and 1B, or by shaving a plate to form the second hollow portion 932 to a thinner thickness than other parts as shown in FIG. 2A, or by pressing a flat thin plate only at the peripheries of the second hollow portion 932.

The sensor device 1 of the embodiment is assembled as follows. First, the sensor element 214 is placed in the first hollow portion 931 inside the recessed section of the package 202. Here, the flat portion of the first hollow portion 931 is formed, for example, to be 10 μm to 300 μm larger than the outer dimension of the bottom surface of the sensor element. Therefore, the bottom part of the sensor element can be easily fitted with the flat portion and does not wobble. Next, the second hollow portion 932 of the lid 204 is fitted with the top part of the sensor element 214. Here, the flat portion of the second hollow portion 932 is formed, for example, to be 10 μm to 300 μm larger than the outer dimension of the top surface of the sensor element 214. Therefore, the second hollow portion 932 can be easily fitted with the top part of the sensor element 214 and does not wobble. Finally, in this state, seam welding to join the package 202 and the lid 204 together is carried out. With such a configuration, the package 202 as the first member and the lid 204 as the second member are indirectly aligned with each other via the sensor element 214 and do not wobble. Therefore, the sensor element 214 and the lid 204 do not become misaligned by vibration in a carrying process of seam welding or the pressing force of roller electrodes. Thus, the sensor device can be produced, securing a sufficient length between the inside and outside of the package 202 at the circumferential edge of the lid 204 and the joining surface 224 of the package 202. Therefore, the sensor device can stably maintain detection characteristics of the sensor element 214 accommodated in the package 202 over a long period.

The sensor device 1 of this embodiment is inserted, for example, between pressurizing plates 82 (FIG. 7), 92 (FIG. 8), described later, from a normal direction of a contact surface 222 of the sensor element 214 and is then pressurized. The bottom of the first hollow portion 931 of the package 202 is a flat surface (first flat portion 933) and is in surface contact with the bottom surface (first contact surface) of the sensor element 214. The bottom of the second hollow portion 932 of the lid 204 is a flat surface (second flat portion 934) and is in surface contact with the top surface (second contact surface) of the sensor element 214. On these contact surfaces, direct contact takes place without using an adhesive or the like and there is no member that causes creep in the transmission path of applied pressure. Therefore, a fall in applied pressure due to a creep phenomenon does not occur. Thus, detection characteristics of the sensor elements accommodated in the package can be stably maintained for a long period.

Second Embodiment

Figure 3:
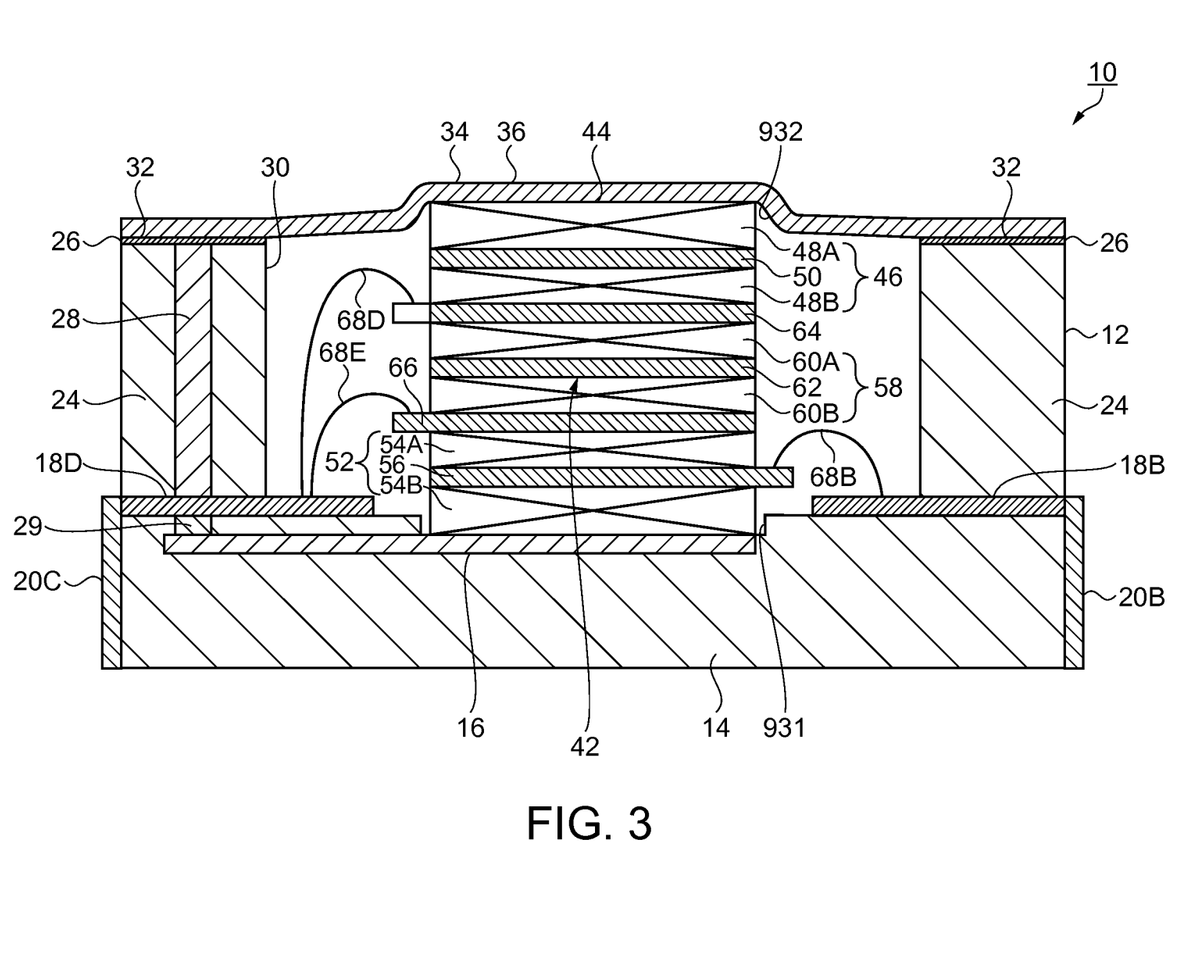
FIG. 3 is a sectional view showing a sensor device according to a second embodiment.
Figure 4:
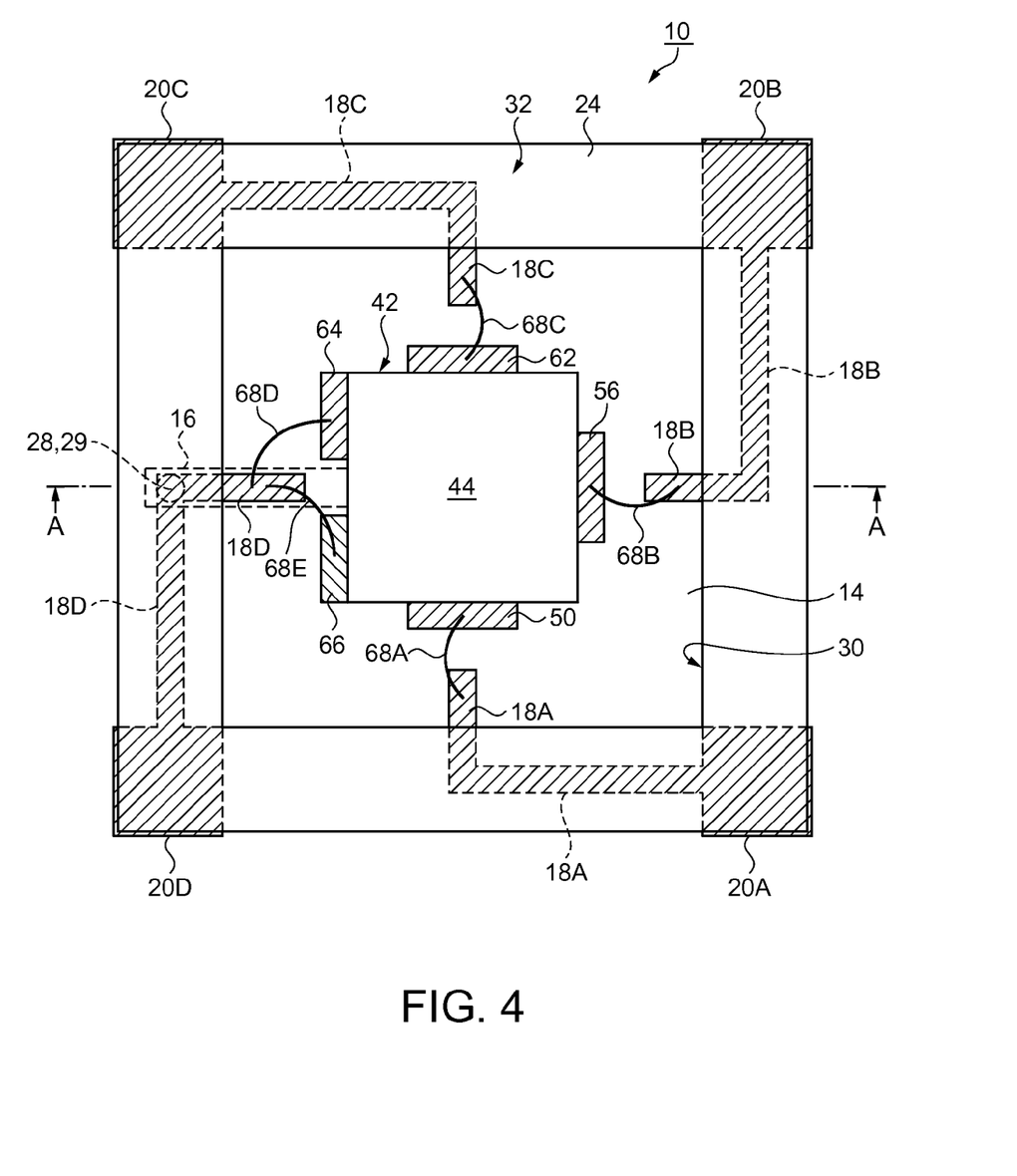
FIG. 4 is a plan view showing the sensor device according to the second embodiment (the lid is not shown).
Figure 5:
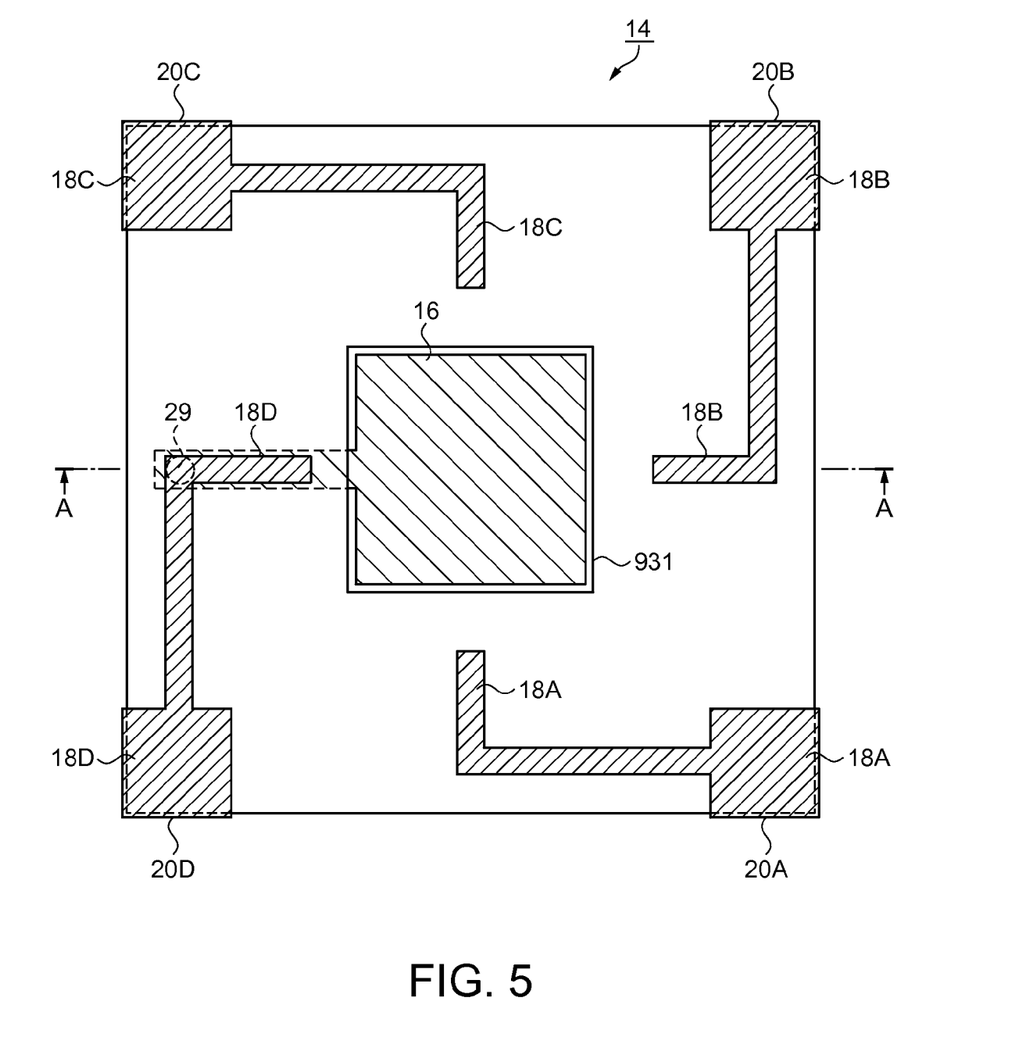
FIG. 5 is a plan view showing a package base according to the second embodiment.

FIG. 3 shows a sectional view of a sensor device according to a second embodiment. FIG. 4 shows a plan view of the sensor device according to the second embodiment (the lid is not shown). FIG. 5 shows a plan view of a package base according to this embodiment. Here, FIG. 3 is equivalent to a sectional view taken along A-A in FIGS. 4 and 5. A sensor device 10 of the second embodiment, which is a device which detects forces in directions of orthogonal three axes, has the same effects and advantages as the sensor device 1 of the first embodiment.

The sensor device 10 of this embodiment is mainly formed by a package 12 (first member), a sensor element 42, and a lid 34 (second member). The package 12 has a recessed section. A first hollow portion 931 which a bottom part of the sensor element 42 fits with is formed on the inner bottom surface of the recessed section. On the lid 34, a second hollow portion 932 which a top part of the sensor element 42 fits with is formed. The bottom part of the sensor element 42 is placed inside the first hollow portion 931. The lid 34 is placed on the sensor element 42 in the state where the second hollow portion 932 is fitted with the top part of the sensor element 42, and the lid 34 covers an opening 30 of the recessed section of the package 12. The lid 34 is joined at its circumferential edge to a joining surface 32 of the package 12.

The sensor device 10 of this embodiment is then inserted between pressurizing plates 82 (FIG. 7), 92 (FIG. 8), described later, from a normal direction of a contact surface 44 of the sensor element 42 (from the γ-axis direction in FIG. 6) and is pressurized.

The package 12 is made of an insulating material such as ceramics. The package 12 has a package base 14 which is in the shape of a rectangular flat plate (it may be disc-shaped or the like) as viewed in a plan view from the direction of the depth of the recessed section of the package 12 and on which the sensor element 42 is arranged. The package 12 also has a ring-shaped side wall member 24 having the same outer shape as the package base 14 as viewed in a plan view (FIG. 4) and arranged on the package base 14 in such a way as to surround the periphery of the sensor element 42.

As shown in FIG. 5, a ground electrode 16 connecting to the sensor element 42 is arranged at the center on the top surface of the package base 14. Side electrodes 20A, 20B, 20C, 20D are arranged at the (four) corner parts of the lateral sides of the package base 14. The side electrodes 20A, 20B, 20C, 20D are connected via a wire or the like, for example, to an electronic circuit (not shown) which detects output from the sensor device 10.

As shown in FIGS. 3, 4 and 5, connection electrodes 18A, 18B, 18C, 18D are arranged on the top surface of the package base 14. The connection electrodes 18A, 18B, 18C, 18D are arranged to be connected to the side electrodes 20A, 20B, 20C, 20D, respectively, and have one end thereof arranged at each corner position of the package base 14. The other end of the connection electrodes 18A, 18B, 18C is arranged near the ground electrode 16. The other end of the connection electrode 18D is connected to the ground electrode 16 via a through-electrode 29.

As shown in FIGS. 3 and 4, the side wall member 24 is stacked at a position to be a circumferential edge on the package base 14. The side wall member 24 is arranged to cover the connection electrodes 18A, 18B, 18C, 18D. However, since the side wall member 24 is a rectangular ring-shaped member, the side wall member 24 is stacked on the package base 14 in the state where the other end of the connection electrodes 18A, 18B, 18C, 18D is exposed to the inner side of the side wall member 24 and the ground electrode 16 is exposed as well. Thus, the side wall member 24 forms the opening 30 of the recessed section of the package 12.

As shown in FIG. 3, a metalized layer 26 is arranged on the top surface of the side wall member 24 and this becomes a joining surface 32 of the package 12 (side wall member 24). As shown in FIGS. 3 and 4, a through-electrode 28 penetrating the side wall member 24 in the direction of height is arranged at the position facing the connection electrode 18D, in the side wall member 24. The metalized layer 26 and the connection electrode 18D are electrically connected to each other via the through-electrode 28.

The ground electrode 16 and the connection electrodes 18A, 18B, 18C, 18D are made of an electrically conductive metal. The metalized layer 26 can be made of the same material as the ground electrode 16 and the like.

As shown in FIG. 3, the lid 34 is electrically connected to the connection electrode 18D via the metalized layer 26 and the through-electrode 28. The process of joining the lid 34 of the sensor device 10 of the second embodiment is similar to the first embodiment.

As shown in FIG. 3, the sensor element 42 is a plate-like substrate made of, for example, quartz crystal, lead zirconate titanate (PZT: Pb(Zr,Ti)O$_3$), lithium niobate, lithium tantalate, having a piezoelectric property. In this embodiment, a quartz plate is used as a piezoelectric material. The sensor element 42 includes a first sensor element 46, a third sensor element 58, and a second sensor element 52 stacked in order from above. The first sensor element 46 includes first quartz plates 48A, 48B formed to sandwich a first detection electrode 50. The second sensor element 52 includes second quartz plates 54A, 54B formed to sandwich a second detection electrode 56. The third sensor element 58 includes third quartz plates 60A, 60B to sandwich a third detection electrode 62.

A first ground electrode 64 is arranged between the first sensor element 46 (first quartz plate 48B) and the third sensor element 58 (third quartz plate 60A). A second ground electrode 66 is arranged between the third sensor element 58 (third quartz plate 60B) and the second sensor element (second quartz plate 54A). The top surface of the first sensor element 46 (first quartz plate 48A) is the contact surface 44 of the sensor element 42. This top surface contacts a force transmission portion 36 of the lid 34 and is thus grounded. The bottom surface of the second sensor element 52 (second quartz plate 54B) is connected to the ground electrode 16 and thus grounded.

As shown in FIG. 4, the first detection electrode 50, the second detection electrode 56, the third detection electrode 62, the first ground electrode 64, and the second ground electrode 66 are arranged, partly protruding from the first to third quartz plates. The first detection electrode 50 is connected to an exposed part (other end side) of the connection electrode 18A via an electrically conductive wire 68A. The second detection electrode 56 is connected to an exposed portion (other end side) of the connection electrode 18B via a wire 68B. The third detection electrode 62 is connected to an exposed portion (other end side) of the connection electrode 18C via a wire 68C. The first ground electrode 64 and the second ground electrode 66 are connected to an exposed portion (other end side) of the connection electrode 18D via wires 68D, 68E, respectively.

By the above connection, the side electrode 20A is electrically connected to the first detection electrode 50 via the connection electrode 18A and the wire 68A. The side electrode 20B is electrically connected to the second detection electrode 56 via the connection electrode 18B and the wire 68B. The side electrode 20C is electrically connected to the third detection electrode 62 via the connection electrode 18C and the wire 68C.

The side electrode 20D is electrically connected to the ground electrode 16 via the connection electrode 18 and the through-electrode 29. Moreover, the side electrode 20D is electrically connected to the first ground electrode 64 via the wire 68D connected to the connection electrode 18D. The side electrode 20D is also electrically connected to the second ground electrode 66 via the wire 68E connected to the connection electrode 18D. The side electrode 20D is also electrically connected to the lid 34 via the through-electrode 28 connected to the connection electrode 18D and via the metalized layer 26.

As materials of the above various electrodes, gold, titanium, aluminum, copper, iron or the like may be used singly or in combination. For example, stainless steel can be used as an iron alloy and may preferably be used because of its excellent durability and anti-corrosion.

Figure 6:
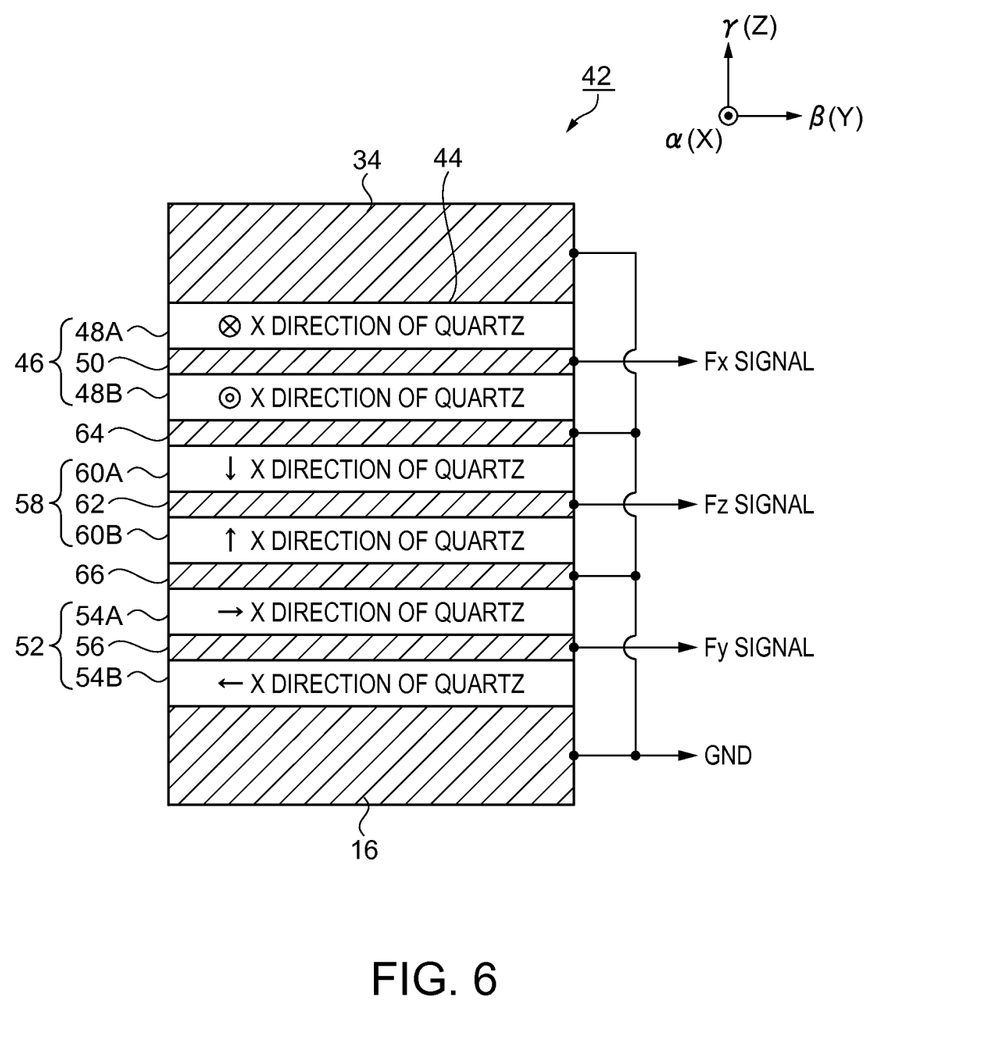
FIG. 6 is a schematic view showing a sensor element according to the second embodiment.

FIG. 6 shows a schematic view of the sensor element of this embodiment. In this embodiment, the force transmission portion 36 can transmit not only a force in a direction parallel to the normal direction (γ axis) of the contact surface 44 of the sensor element 42 but also forces in the planar direction of the contact surface 44, that is, forces in two directions (α axis, β axis) orthogonal to the γ axis and orthogonal to each other, to the contact surface 44. The sensor element 42 (first sensor element 46, second sensor element 52, third sensor element 58) can detect forces parallel to the α axis, β axis, and γ axis, as described later.

In the first sensor element 46, the first quartz plates 48A, 48B are made of Y-cut quartz plates and have such a crystal orientation that an X direction that is a crystal orientation to generate a piezoelectric effect is perpendicular to the normal line (direction parallel to the γ axis in FIG. 6) of the first quartz plates 48A, 48B. The first quartz plates 48A, 48B are arranged in such a way that their respective X directions are opposite to each other. Moreover, the first quartz plates 48A, 48B are arranged in such a way that their X directions are parallel to the α axis of the spatial orthogonal coordinate system.

In the second sensor element 52, the second quartz plates 54A, 54B are made of Y-cut quartz plates and have such a crystal orientation that an X direction is perpendicular to the normal line (direction parallel to the γ axis) of the second quartz plates 54A, 54B. The second quartz plates 54A, 54B are arranged in such a way that their respective X directions are opposite to each other. Moreover, the second quartz plates 54A, 54B are arranged in such a way that their X directions are parallel to the β axis of the spatial orthogonal coordinate system.

In the third sensor element 58, the third quartz plates 60A, 60B are made of X-cut quartz plates and have such a crystal orientation that an X direction is parallel to the normal line (direction parallel to the γ axis) of the third quartz plates 60A, 60B. The third quartz plates 60A, 60B are arranged in such a way that their respective X directions are opposite to each other. Moreover, the third quartz plates 60A, 60B are arranged in such a way that their X directions are parallel to the γ axis of the spatial orthogonal coordinate system.

As shown in FIG. 6, in the sensor element 42 of this embodiment, the direction parallel to the γ axis of the spatial orthogonal coordinate system is the direction of height of the sensor device 10. As described later, the sensor element 42 is inserted between the pressurizing plates 82 (FIG. 7), 92 (FIG. 8) from the direction of the γ axis, and thus pressurized by the pressurizing plates. Pressure is applied to the sensor element 42 from a direction parallel to the γ axis via the lid 34 (force transmission portion 36). Thus, the third quartz plates 60A, 60B receive applied pressure (compressive force) from the X direction and therefore induce electric charge by a piezoelectric effect. The electric charge (Fz signal) is outputted to the third detection electrode 62.

In the above configuration, if an external force that causes the relative positions of the two pressurizing plates to shift in a direction parallel to the α axis is applied, an external force parallel to the α axis is applied to the sensor element 42 via the force transmission portion 36. Then, the first quartz plates 48A, 48B receive an external force (shear force) from the X direction and therefore electric charge is induced by a piezoelectric effect. The electric charge (Fx signal) is outputted to the first detection electrode 50.

Meanwhile, if an external force that causes the relative positions of the two pressurizing plates to shift in a direction parallel to the β axis is applied, an external force parallel to the β axis is applied to the sensor element 42 via the force transmission portion 36. Then, the second quartz plates 54A, 54B receive an external force (shear force) from the X direction and therefore electric charge is induced by a piezoelectric effect. The electric charge (Fy signal) is outputted to the second detection electrode 56.

Moreover, if an external force that causes the relative positions of the two pressurizing plates to shift in a direction parallel to the γ axis is applied, an external force parallel to the γ axis is applied to the sensor element 42 via the force transmission portion 36. Then, the third quartz plates 60A, 60B receive an external force (compressive force or tensile force) from the X direction and therefore the amount of electric charge induced by a piezoelectric effect changes. The amount of electric charge (Fz signal) outputted to the third detection electrode 62 changes.

Thus, the sensor device 10 of this embodiment can monitor the electric charge (Fx signal) outputted to the first detection electrode 50 via the side electrode 20A, the electric charge (Fy signal) outputted to the second detection electrode 56 via the side electrode 20B, and the electric charge (Fz signal) outputted to the third detection electrode 62 via the side electrode 20C, and can detect the external forces (Fx, Fy, Fz) in the directions parallel to the α axis (X axis, as described later), the β axis (Y axis, as described later), and the γ axis (Z axis, as described later), which are orthogonal to each other. While the sensor element 42 has a multilayer structure including the first sensor element 46, the second sensor element 52, and the third sensor element 58, the sensor element 42 may also have a configuration using at least one or more. The first sensor element 46, the second sensor element 52, and the third sensor element 58 need not necessarily be stacked in layers. Each sensor element may be accommodated in parallel inside the package 12 so that the force transmission portion 36 can contact the top surface (contact surface) of each sensor element.

Third Embodiment

Figure 7:
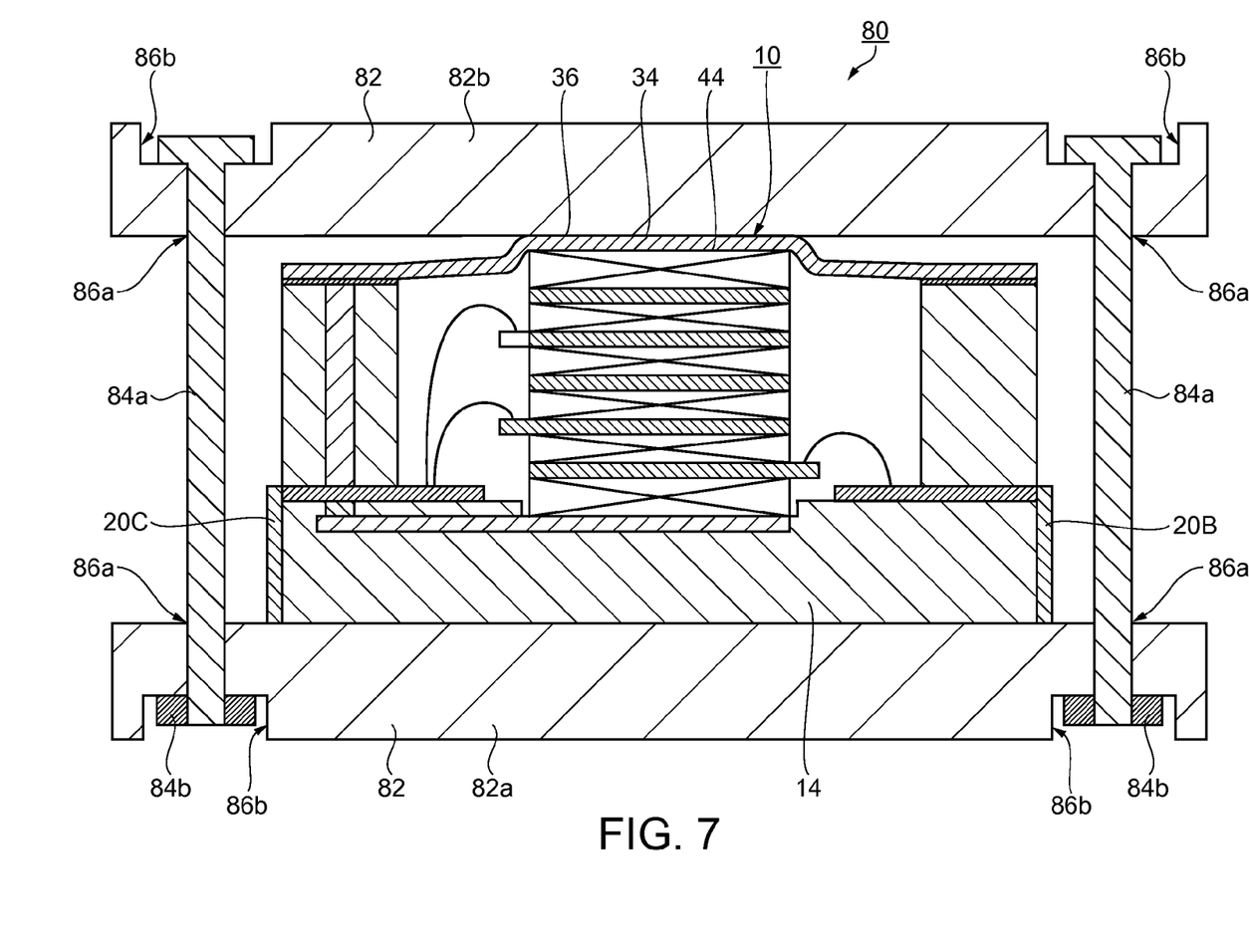
FIG. 7 is a sectional view showing a sensor module according to a third embodiment.

FIG. 7 shows a sectional view of a sensor module of this embodiment. A sensor module 80 of this embodiment has a configuration in which the sensor device 10 of the second embodiment (it may be the sensor device 1 of the first embodiment) is inserted between the pressurizing plates 82 and in which the pressurizing plates 82 are fastened to each other by a fastening portion, thus pressurizing the sensor device 10.

The pressurizing plates 82 include a first plate 82a which contacts the package 12, and a second plate 82b which contacts the lid 34 (force transmission portion 36). The fastening portion includes a fastening bolt 84a and a fastening nut 84b. In the first plate 82a and the second plate 82b, bolt holes 86a through which the fastening bolt 84a is inserted is formed and counterbores 86b accommodating the head of the fastening bolt 84a and the fastening nut 84b are formed in communication with the bolt holes 86a.

Here, in the state where the sensor device 10 is held between the first plate 82a and the second plate 82b, the fastening bolt 84a is inserted through the bolt hole 86a and the plates are fastened with the fastening bolt 84a and the fastening nut 84b. Then, the first plate 82a and the second plate 82b receive forces in the direction of approaching each other from the fastening portion and the sensor device 10 is pressurized in the direction of height. Thus, the lid 34 (force transmission portion 36) forming the sensor device 10 applies pressure to the contact surface 44 of the sensor element 42.

As in the foregoing embodiment, the side electrodes 20A, 20B, 20C, 20D are connected to an electronic circuit (not shown) which receives a signal from the sensor device 10. Therefore, if an external force is applied to the pressurizing plates 82, the external force is transmitted to the contact surface 44 via the force transmission portion 36 and the force received by the contact surface 44 changes. This causes the output of a signal outputted from the sensor device 10 to change. Thus, by using the output of the signal in the case of pressurization only as a reference and monitoring the amount of change in the output of the signal, the force applied to the sensor module 80 (including the direction of the force) can be detected. Also, an electronic circuit (not shown) may be embedded at the position on the first plate 82a that faces the sensor device 10, and the side electrodes 20A, 20B, 20C, 20D of the sensor device 10 may be extended to the lower surface of the package 12. An electrode (not shown) mounted on the electronic circuit (not shown) and the portions of the side electrode 20A, 20B, 20C, 20D extended to the lower surface of the package 12 may be soldered or connected to each other by other measures.

Fourth Embodiment

Figure 8:
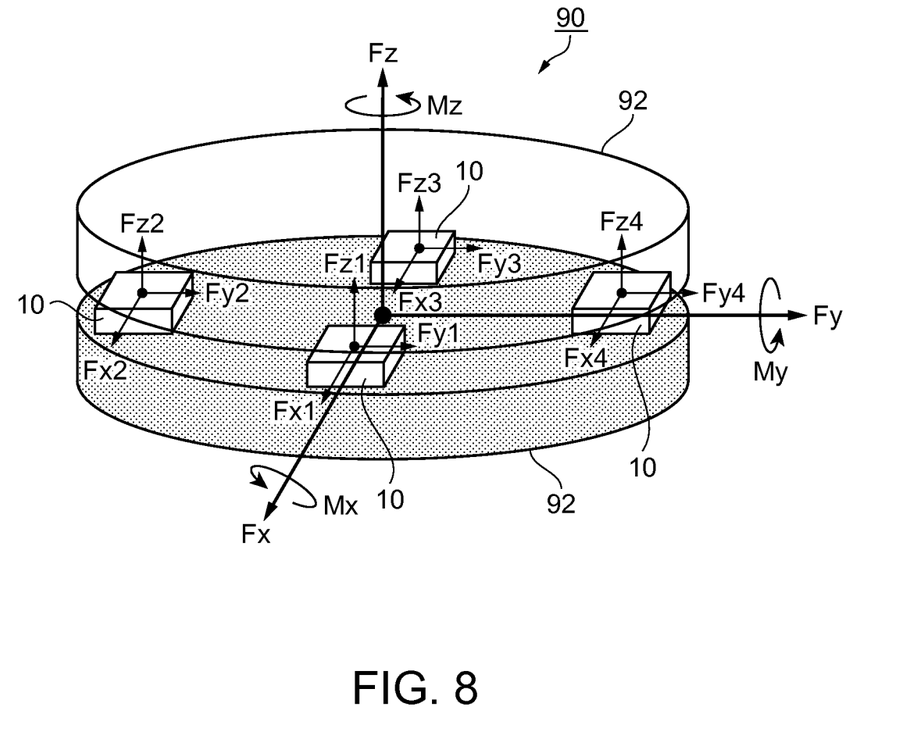
FIG. 8 is a schematic view showing a force detection device according to a fourth embodiment.

FIG. 8 shows a force detection device of this embodiment. A force detection device 90 of this embodiment has a configuration in which four sensor devices 10 are held between two pressurizing plates 92. An electronic circuit (not shown) electrically connected to the sensor devices 10 via wires or the like is arranged. In the force detection device 90, the four sensor devices 10 are inserted between the pressurizing plates 92 in the state where all the four sensor devices 10 face the same direction, and pressure is then applied. For example, in the sensor devices 10, the detection axis of the first sensor element 46 (FIG. 6) faces a direction parallel to Fx. The detection axis of the second sensor element 52 (FIG. 6) faces a direction parallel to Fy. The detection axis of the third sensor element 58 (FIG. 6) faces a direction parallel to Fz.

Here, if a force that causes the relative positions of the pressurizing plates 92 to shift in the Fx direction is applied, the sensor devices 10 detect forces Fx1, Fx2, Fx3, Fx4, respectively. If a force that causes the relative positions of the pressurizing plates 92 to shift in the Fy direction is applied, the sensor devices 10 detect forces Fy1, Fy2, Fy3, Fy4, respectively. Moreover, if a force that causes the relative positions of the pressurizing plates 92 to shift in the Fz direction is applied, the sensor devices 10 detect forces Fz1, Fz2, Fz3, Fz4, respectively. Between the pressurizing plates 92, a relative displacement in which the pressurizing plates 92 shift from each other in a direction of rotating about the X axis (Mx), a relative displacement in which the pressurizing plates 92 shift from each other in a direction of rotating about the Y axis (My), and a relative displacement in which the pressurizing plates 92 shift from each other in a direction of rotating about the Z axis (Mz) can take place. Forces involved in these relative displacements can be transmitted to the sensor devices 10.

Therefore, in the force detection device 90, the forces Fx, Fy, Fz orthogonal to each other, the rotating force Mx about a direction parallel to Fx as its rotation axis, the rotating force My about a direction parallel to Fy as its rotation axis, and the rotation force Mz about a direction parallel to Fz as its rotation axis can be calculated as follows.

$$Fx=Fx1+Fx2+Fx3+Fx4$$

$$Fy=Fy1+Fy2+Fy3+Fy4$$

$$Fz=Fz1+Fz2+Fz3+Fz4$$

$$Mx=b\times(Fz4-Fz2)$$

$$My=a\times(Fz3-Fz1)$$

$$Mz=b\times(Fx2-Fx4)+a\times(Fy1-Fy3)$$

Here, a and b are constants. Therefore, the force detection device 90 of this embodiment can detect a force in any three-dimensional direction (forces in six-axis directions). The force detection device 90 can realize airtight sealing of the sensor element 42 accommodated in the package 12 stably over a long period.

Fifth Embodiment

Figure 9:
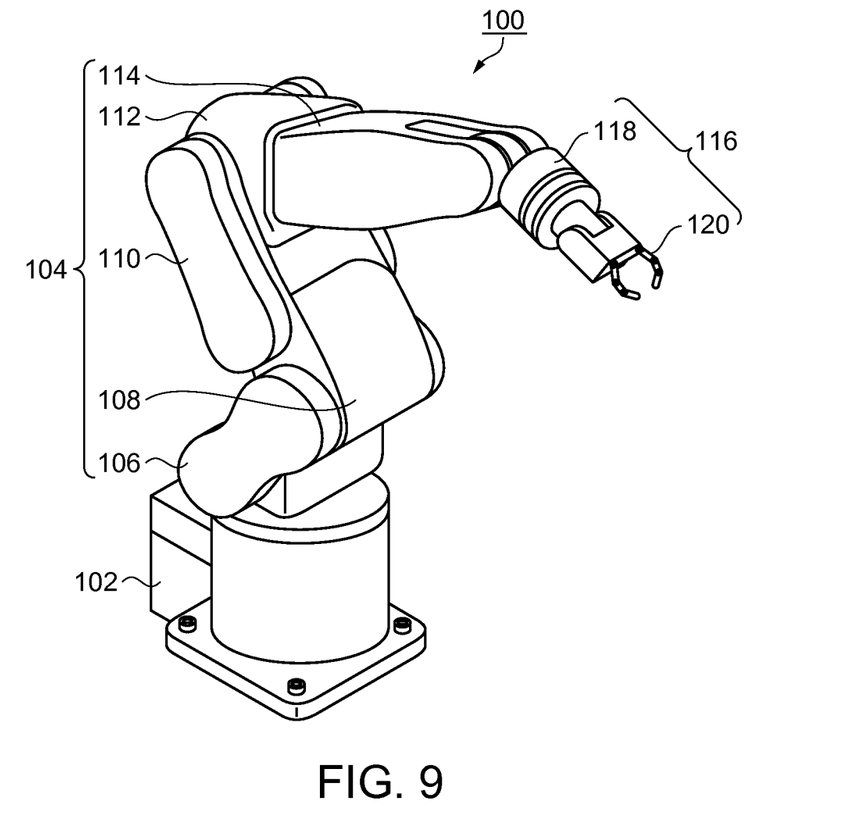
FIG. 9 is a schematic view showing a robot equipped with a force detection device according to a fifth embodiment.

FIG. 9 shows a robot equipped with a force detection device according to this embodiment. As shown in FIG. 9, a robot 100 includes a main body portion 102, an arm portion 104, a robot hand portion 116 or the like. The main body portion 102 is fixed, for example, onto a floor, wall, ceiling, movable trolley or the like. The arm portion 104 is provided movably in relation to the main body portion 102. An actuator (not shown) which generates motive power to rotate the arm portion 104 and a control unit or the like (not shown) which controls the actuator are provided inside the arm portion 104.

The arm portion 104 includes a first frame 106, a second frame 108, a third frame 110, a fourth frame 112, and a fifth frame 114. The first frame 106 is connected to the main body portion 102 in such a way that the first frame 106 can rotate or bend in relation to the main body portion 102 via a rotating/bending axis. The second frame 108 is connected to the first frame 106 and the third frame 110 via rotating/bending axes. The third frame 110 is connected to the second frame 108 and the fourth frame 112 via rotating/bending axes. The fourth frame 112 is connected to the third frame 110 and the fifth frame 114 via rotating/bending axes. The fifth frame 114 is connected to the fourth frame 112 via a rotating/bending axis.

The arm portion 104 is driven as each frame rotates or bends about each rotating/bending axis in combination with the other frames under the control of the control unit.

The robot hand portion 116 is attached to the distal end of the fifth frame 114. A robot hand 120 that can grasp an object is connected to the fifth frame 114 via a robot hand connecting portion 118 having a built-in motor (not shown) which causes rotational operation.

Inside the robot hand connecting portion 118, the above force detection device 90 (FIG. 8) is arranged in addition to the motor. Thus, when the robot hand portion 116 is moved to a predetermined operation position under the control of the control unit, the force detection device 90 can detect, as a force, contact with an obstacle or contact with an object in response to an operation command beyond a predetermined position or the like. The detected force can be fed back to the control unit of the robot 100 and an avoidance operation can be executed.

By using this robot 100, an obstacle avoidance operation, an object damage avoidance operation and the like which cannot be coped with by the related-art position control can be easily carried out. The robot 100 that can carry out safe and fine-tuned work can be provided. Moreover, the robot 100 can stably detect a force with high accuracy even when the amount of displacement is small. The invention is not limited to this embodiment and can also be applied to a two-arm robot.

The entire disclosure of Japanese Patent Application No. 2012-182987 filed Aug. 22, 2012 is expressly incorporated by reference herein.

What is claimed is:

1. A robot comprising:
a main body portion;
an arm portion connecting to the main body portion; and
a hand portion connecting to the arm portion;
wherein the robot has a sensor device at a connecting part between the arm portion and the hand portion,
the sensor device includes
    a first member having a recessed section,
    a sensor element having a piezoelectric material and arranged in the recessed section, and
    a second member joined to the first member in such a way as to seal the recessed section,
wherein the sensor element has
    a first contact surface which the first member contacts, and
    a second contact surface which the second member contacts,
    a first hollow portion in which the first contact surface fits is formed on an inner bottom surface of the recessed section, and
    a second hollow portion in which the second contact surface fits is formed on the second member.

* * * * *